(12) United States Patent
Takagi et al.

(10) Patent No.: US 8,149,455 B2
(45) Date of Patent: Apr. 3, 2012

(54) COLOR REPRODUCTION METHOD USING B-SPLINE APPROXIMATION

(75) Inventors: Atsushi Takagi, Toyota (JP); Daisuke Iwamoto, Nagoya (JP); Junji Ishida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 796 days.

(21) Appl. No.: 12/159,269

(22) PCT Filed: Jan. 26, 2007

(86) PCT No.: PCT/JP2007/051305
§ 371 (c)(1),
(2), (4) Date: Jun. 26, 2008

(87) PCT Pub. No.: WO2007/088793
PCT Pub. Date: Aug. 9, 2007

(65) Prior Publication Data
US 2010/0171968 A1    Jul. 8, 2010

(30) Foreign Application Priority Data

Jan. 31, 2006 (JP) .................................. 2006-023740

(51) Int. Cl.
*G06K 1/00* (2006.01)
*G06K 9/00* (2006.01)
*H04N 1/46* (2006.01)
*G09G 5/02* (2006.01)
(52) U.S. Cl. .......... 358/1.9; 358/525; 382/167; 345/604
(58) Field of Classification Search .................. None
See application file for complete search history.

(56) References Cited

U.S. PATENT DOCUMENTS 5,237,649 A * 8/1993 Yamada ........................ 345/442
(Continued)

FOREIGN PATENT DOCUMENTS

JP        7-50760        2/1995
(Continued)

OTHER PUBLICATIONS

Ian E. Bell and Bonny H. P. Liu, Color management with a hammer: the B-spline fitter, SPIE vol. 5008 (2003) © 2003 SPIE-IS&T, pp. 314-327.*

(Continued)

*Primary Examiner* — Twyler Haskins
*Assistant Examiner* — Barbara Reinier
(74) *Attorney, Agent, or Firm* — Finnegan, Henderson, Farabow, Garrett & Dunner, LLP

(57) ABSTRACT

A units of red $\{u_1\text{-}u_A\}$, B units of green $\{v_1\text{-}v_B\}$ and C units of blue $\{w_1\text{-}w_C\}$ are sampled and measurements are performed, and an interpolation equation is found from the A×B×C units of data in three-dimensions (L*, a*, b*) that are obtained. Firstly, A units of point sequence data in 3×B×C dimensions are least squares approximated for the parameters u, and Mu control points in 3×B×C dimensions are found. Then, B units of point sequence data in 3×C×Mu dimensions are least squares approximated for the parameters v, and Mv control points in 3×C×Mu dimensions are found. Next, C units of point sequence data in 3×Mu×Mv dimensions are least squares approximated for the parameters w, and Mw control points in 3×Mu×Mv dimensions are found. Then, output values (L*,a*,b*) corresponding to arbitrary input values (Red,Green,Blue) can be obtained by an interpolation equation according to Mu×Mv×Mw final control points in three dimensions and basis functions used in the least squares approximations.

3 Claims, 16 Drawing Sheets

U.S. PATENT DOCUMENTS

2009/0252411 A1* 10/2009 Siddiqui et al. ............... 382/167

FOREIGN PATENT DOCUMENTS

| JP | 7-150081 | 6/1995 |
| JP | 9-79907 | 3/1997 |
| JP | 9-130626 | 5/1997 |
| JP | 9-214791 | 8/1997 |
| JP | 11-146217 | 5/1999 |
| JP | 11-311573 | 11/1999 |
| JP | 2000-251054 | 9/2000 |
| JP | 2001-283210 | 10/2001 |

OTHER PUBLICATIONS

Notification of the First Office Action for Chinese Patent Application No. 200780001782.9 dated Jul. 30, 2010.

Bell, I. et al., "Color management with a hammer: the B-spline fitter," Proceedings of SPIE, vol. 5008, (2003), pp. 319-321.

* cited by examiner

FIG. 4

| INPUT VALUES | | | OUTPUT VALUES (MEASUREMENT VALUES) | | |
|---|---|---|---|---|---|
| Red | Green | Blue | L* | a* | b* |
| $u_1=0$ | $v_1=0$ | $w_1=0$ | $x_{1,1,1}$ | $y_{1,1,1}$ | $z_{1,1,1}$ |
| $u_1$ | $v_1$ | $w_2$ | $x_{1,1,2}$ | $y_{1,1,2}$ | $z_{1,1,2}$ |
| . | . | . | . | . | . |
| $u_1$ | $v_1$ | $w_C$ | $x_{1,1,C}$ | $y_{1,1,C}$ | $z_{1,1,C}$ |
| $u_1$ | $v_2$ | $w_1$ | $x_{1,2,1}$ | $y_{1,2,1}$ | $z_{1,2,1}$ |
| . | . | . | . | . | . |
| $u_1$ | $v_B$ | $w_C$ | $x_{1,B,C}$ | $y_{1,B,C}$ | $z_{1,B,C}$ |
| $u_2$ | $v_1$ | $w_1$ | $x_{2,1,1}$ | $y_{2,1,1}$ | $z_{2,1,1}$ |
| . | . | . | . | . | . |
| $u_2$ | $v_B$ | $w_C$ | $x_{2,B,C}$ | $y_{2,B,C}$ | $z_{2,B,C}$ |
| . | . | . | . | . | . |
| $u_A$ | $v_1$ | $w_1$ | $x_{A,1,1}$ | $y_{A,1,1}$ | $z_{A,1,1}$ |
| . | . | . | . | . | . |
| $u_A=255$ | $v_B=255$ | $w_C=255$ | $x_{A,B,C}$ | $y_{A,B,C}$ | $z_{A,B,C}$ |

A = { BxC, BxC, ..., BxC }

POINT $Q_{u1}$ CORRESPONDING TO $u_1$ IN 3×B×C DIMENSIONS

POINT $Q_{u2}$ CORRESPONDING TO $u_2$ IN 3×B×C DIMENSIONS } A

POINT $Q_{uA}$ CORRESPONDING TO $u_A$ IN 3×B×C DIMENSIONS

3 DIMENSIONS

FIG. 5

| POINT | INPUT | OUTPUTS | | | | | | | | | |
|---|---|---|---|---|---|---|---|---|---|---|---|
| $Q_{u1}$ | $u_1$ | $x_{1,1,1}$ | $y_{1,1,1}$ | $z_{1,1,1}$ | $x_{1,1,2}$ | $y_{1,1,2}$ | $z_{1,1,2}$ | ⋮ | $x_{1,B,C}$ | $y_{1,B,C}$ | $z_{1,B,C}$ |
| $Q_{u2}$ | $u_2$ | $x_{2,1,1}$ | $y_{2,1,1}$ | $z_{2,1,1}$ | $x_{2,1,2}$ | $y_{2,1,2}$ | $z_{2,1,2}$ | ⋮ | $x_{2,B,C}$ | $y_{2,B,C}$ | $z_{2,B,C}$ |
| ⋮ | ⋮ | · | · | · | · | · | · | · | · | · | · |
| $Q_{uA}$ | $u_A$ | $x_{A,1,1}$ | $y_{A,1,1}$ | $z_{A,1,1}$ | $x_{A,1,2}$ | $y_{A,1,2}$ | $z_{A,1,2}$ | ⋮ | $x_{A,B,C}$ | $y_{A,B,C}$ | $z_{A,B,C}$ |

A (rows)

3×B×C DIMENSIONS

FIG. 7

| POINT | INPUT | OUTPUTS | | | | | | |
|---|---|---|---|---|---|---|---|---|
| $P^u_1$ | $u_1$ | $P^u_{1,1}$ | $P^u_{1,2}$ | $P^u_{1,3}$ | ⋮ | ⋮ | ⋮ | ⋮ |
| $P^u_2$ | $u_2$ | ⋮ | ⋮ | ⋮ | ⋮ | ⋮ | ⋮ | ⋮ |
| ⋯ | ⋯ | ⋯ | ⋯ | ⋯ | ⋯ | ⋯ | ⋯ | ⋯ |
| ⋯ | ⋯ | ⋯ | ⋯ | ⋯ | ⋯ | ⋯ | ⋯ | ⋯ |
| $P^u_{Mu}$ | $u_A$ | ⋯ | ⋯ | ⋯ | ⋯ | $P^u_{3\times B\times C, Mu-2}$ | $P^u_{3\times B\times C, Mu-1}$ | $P^u_{3\times B\times C, Mu}$ |

Mu (rows); 3×B×C DIMENSIONS (columns)

FIG. 8

| INPUT VALUES | | | CONTROL POINTS | | |
|---|---|---|---|---|---|
| Red | Green | Blue | L* | a* | b* |
| $u_1$ | $v_1$ | $w_1$ | $P^u_{1,1}$ | $P^u_{1,2}$ | $P^u_{1,3}$ |
| ⋮ | ⋮ | ⋮ | ⋮ | ⋮ | ⋮ |
| $u_1$ | $v_B$ | $w_C$ | ⋮ | ⋮ | ⋮ |
| $u_2$ | $v_1$ | $w_1$ | ⋮ | ⋮ | ⋮ |
| ⋮ | ⋮ | ⋮ | ⋮ | ⋮ | ⋮ |
| $u_2$ | $v_B$ | $w_C$ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| $u_{Mu}$ | $v_1$ | $w_1$ | ⋮ | ⋮ | ⋮ |
| ⋮ | ⋮ | ⋮ | ⋮ | ⋮ | ⋮ |
| $u_{Mu}$ | $v_B$ | $w_C$ | $P^u_{3 \times B \times C, Mu-2}$ | $P^u_{3 \times B \times C, Mu-1}$ | $P^u_{3 \times B \times C, Mu}$ |

Mu { (B×C, B×C, B×C groupings on left)

3 DIMENSIONS (on right bracket)

FIG. 9

| INPUT VALUES | | | CONTROL POINTS | | |
|---|---|---|---|---|---|
| Green | Blue | Red | L* | a* | b* |
| $v_1$ | $w_1$ | $u_1$ | $P^u_{1,1}$ | $P^u_{1,2}$ | $P^u_{1,3}$ |
| ⋮ | ⋮ | ⋮ | ⋮ | ⋮ | ⋮ |
| $v_1$ | $w_C$ | $u_{Mu}$ | ⋮ | ⋮ | ⋮ |
| $v_2$ | $w_1$ | $u_1$ | ⋮ | ⋮ | ⋮ |
| ⋮ | ⋮ | ⋮ | ⋮ | ⋮ | ⋮ |
| $v_2$ | $w_C$ | $u_{Mu}$ | ⋮ | ⋮ | ⋮ |
| ⋮ | ⋮ | ⋮ | ⋮ | ⋮ | ⋮ |
| $v_B$ | $w_1$ | $u_1$ | ⋮ | ⋮ | ⋮ |
| ⋮ | ⋮ | ⋮ | ⋮ | ⋮ | ⋮ |
| $v_B$ | $w_C$ | $u_{Mu}$ | $P^u_{3\times B\times C, Mu-2}$ | $P^u_{3\times B\times C, Mu-1}$ | $P^u_{3\times B\times C, Mu}$ |

Left braces: $C \times Mu$ (repeated for each $v_i$ group), overall $B$ groups.
Right brace under control points: 3 DIMENSIONS

FIG. 12

| INPUT VALUES | | | CONTROL POINTS | | |
|---|---|---|---|---|---|
| Red | Green | Blue | L* | a* | b* |
| $u_1$ | $v_1$ | $w_1$ | $P^{uvw}_{1,1}$ | $P^{uvw}_{1,2}$ | $P^{uvw}_{1,3}$ |
| ⋮ | ⋮ | ⋮ | ⋮ | ⋮ | ⋮ |
| $u_1$ | $v_1$ | $w_{Mw}$ | ⋮ | ⋮ | ⋮ |
| ⋮ | ⋮ | ⋮ | ⋮ | ⋮ | ⋮ |
| $u_1$ | $v_{Mv}$ | $w_{Mw}$ | ⋮ | ⋮ | ⋮ |
| ⋮ | ⋮ | ⋮ | ⋮ | ⋮ | ⋮ |
| $u_{Mu}$ | $v_1$ | $w_1$ | ⋮ | ⋮ | ⋮ |
| ⋮ | ⋮ | ⋮ | ⋮ | ⋮ | ⋮ |
| $u_{Mu}$ | $v_{Mv}$ | $w_{Mw}$ | $P^{uvw}_{3 \times Mu \times Mv, Mw-2}$ | $P^{uvw}_{3 \times Mu \times Mv, Mw-1}$ | $P^{uvw}_{3 \times Mu \times Mv, Mw}$ |

$Mu$ — rows grouped as $Mv \times Mw$ blocks

Columns grouped as $P^x$, $P^y$, $P^z$

FIG. 14

| INPUT VALUES | | | OUTPUT VALUES (MEASUREMENT VALUES) | | |
|---|---|---|---|---|---|
| Red | Green | Blue | L* | a* | b* |
| 0 | 0 | 0 | 0 | 0 | 0 |
| 0 | 0 | 32 | 0.941998 | 6.619081 | −17.3374 |
| 0 | 0 | 64 | 3.343671 | 23.38771 | −37.6542 |
| 0 | 0 | 96 | 7.628554 | 38.7049 | −52.7365 |
| 0 | 0 | 128 | 12.97531 | 47.50594 | −64.9683 |
| 0 | 0 | 160 | 18.08989 | 55.89147 | −76.1185 |
| 0 | 0 | 192 | 23.01865 | 63.97234 | −87.1238 |
| 0 | 0 | 224 | 27.79599 | 71.80494 | −97.7911 |
| 0 | 0 | 255 | 32.30259 | 79.19363 | −107.854 |
| 0 | 32 | 0 | 9.263574 | −18.7715 | 13.50943 |
| 0 | 32 | 32 | 10.08659 | −11.6396 | −3.44061 |
| 0 | 32 | 64 | 11.97886 | 3.176652 | −23.5925 |
| 0 | 32 | 96 | 143.83108 | 18.29584 | −40.7984 |
| 0 | 32 | 128 | 18.32763 | 31.73986 | −55.79 |
| ⋮ | ⋮ | ⋮ | ⋮ | ⋮ | ⋮ |
| ⋮ | ⋮ | ⋮ | ⋮ | ⋮ | ⋮ |
| 255 | 255 | 192 | 98.66451 | −9.68221 | 30.21366 |
| 255 | 255 | 224 | 99.28484 | −5.10883 | 14.8382 |
| 255 | 255 | 255 | 100 | 0 | 0 |

| PROCESS | | EQUIVALENT COLOR DIFFERENCES | PROCESSING DURATION (SEC) |
|---|---|---|---|
| CONVENTIONAL PROCESS | JP-A 7-50760 | 0.253494 | 696 |
| PROCESS ACCORDING TO PRESENT EMBODIMENT | 3 ORDERS, C1 CONTINUITY, 2 SEGMENTS | 0.217032 | 131.656 |
| | 3 ORDERS, C1 CONTINUITY, 3 SEGMENTS | 0.115373 | 312.422 |
| | 2 ORDERS, C1 CONTINUITY, 6 SEGMENTS | 0.108279 | 312.125 |
| | 2 ORDERS, C1 CONTINUITY, 7 SEGMENTS | 0.068225 | 447.578 |

COLOR REPRODUCTION METHOD USING B-SPLINE APPROXIMATION

CROSS-REFERENCE TO RELATED APPLICATIONS

This application is a national phase application of International Application No. PCT/JP2007/051305, filed Jan. 26, 2007, and claims the priority of Japanese Application No. 2006-023740, filed Jan. 31, 2006, the content of both of which is incorporated herein by reference.

TECHNICAL FIELD

The present invention relates to a color reproduction method, and particularly relates to a color reproduction method which, at a device for performing color printing, color display or the like, finds, for reproducing predetermined colors correspondence relationships between input values and colors that are outputted, and reproduces colors.

BACKGROUND ART

In recent years, devices which deal with color images, such as scanners, digital cameras, monitors, printers, projectors and so forth, have spread rapidly. When color images are to be handled between these devices, the colors change in appearance in accordance with characteristics of the devices. Consequently, color reproduction between devices has become problematic, and proposals for accurate color reproduction methods are desired.

In order to match colors between devices, it is necessary to ascertain beforehand color characteristics that the devices have. With outputting and measuring all colors (for example, with 24-bit color, 16,777,216 colors) in order to ascertain color characteristics of a device, the number of colors is very large and this is not practical. Therefore, color sampling is performed, and estimation of all colors from measured values is performed.

To estimate all colors, it is common to employ linear interpolation which, as shown in FIG. 16A, interpolates from measured sampling points and finds an interpolation point, curvilinear interpolation which, as shown in FIG. 16B, estimates curves (1) to (3) from measured sampling points, estimates a curve (4) from points on the curves and finds an interpolation point, or the like. Because color characteristics of a device cannot be expressed with linear forms, results which are obtained by linear interpolation have poor accuracy, so interpolation is performed using curvilinear interpolation.

However, as another color reproduction method, a technology described in, for example, Japanese Patent Application Laid-Open (J-PA) No. 2001-283210 has been proposed. In the technology described in JP-A No. 2001-283210, coefficients of a matrix calculation equation of relationship equations are varyingly controlled such that differences between tristimulus values of colors which are calculated using the relationship equations, from three primary color values for outputting the colors, and tristimulus values of the colors which are obtained by spectroscopic analysis are minimized. From reference tristimulus values of the colors, which have been prepared in advance, and values of the three primary colors, which output the colors to appear as colors the same as these colors, learning is implemented with a neural network back propagation method or the like, and residuals are calculated on the basis of non-linear forms. A linear variation matrix and residuals are determined, and a profile is created. Hence, it is proposed that colors of images which are outputted from image output means will match colors obtained by spectroscopic analysis.

DISCLOSURE OF THE INVENTION

Problem to be Solved by the Invention

However, with a color reproduction method that uses linear interpolation or curvilinear interpolation, the color characteristics are expressed in a three-dimensional space. Therefore, even if values of required colors are estimated from just portions of measured sampling data, as shown in FIG. 16A and FIG. 16B, results which completely reproduce color characteristics cannot be obtained, and accuracy is insufficient. Moreover, with conventional curvilinear interpolations, there is a problem in that, as shown in FIG. 16B, there is a necessity to repeat curvilinear interpolation in order to estimate a value of a required color, and therefore processing takes time.

Further, with the technology described in JP-A No. 2001-283210, non-linear portions are interpolated using a neural network. Consequently, there is a risk that learning of the neural network will diverge rather than converging, and color reproduction with good accuracy may be difficult.

Furthermore, with the technology described in JP-A No. 2001-283210, a linear conversion matrix is employed at linear portions and learning with a neural network is employed at non-linear portions. Therefore, it is necessary to divide color reproduction into these cases, processing is complicated, and a processing duration (time) is lengthened.

The present invention has been devised in consideration of the above circumstances, and will provide a method for accurate color reproduction in a short processing duration.

Means for Solving the Problem

A first aspect of the present invention is a color reproduction method that finds second color data, of a plurality of components represented in a second color system, corresponding to first color data of a plurality of components represented in a first color system, the second color system differing from the first color system, and the color reproduction method including: measuring each of colors represented by the second color data that correspond to a predetermined plurality of the first color data, and acquiring a plurality of sample data; targeting the respective components of the first color data corresponding to each of the acquired sample data, treating sample data corresponding to one target component as point sequence data in multiple dimensions, represented by a product of a number of components of the second color data and a number of the sample data of the respective components excluding the target component, and finding first control points which represent a characteristic of an approximation curve which approximates with the target components serving as parameters; thereafter targeting another of the components, treating the first control points corresponding to the target component as point sequence data in the multiple dimensions, and finding second control points which represent a characteristic of an approximation curve which approximates with the target components serving as parameters; sequentially altering the target component and finding final control points; and finding an interpolation equation from the final control points that have been found, for interpolating color data other than the sample data.

According to the first aspect, respective colors represented by the second color data corresponding to the predetermined first color data are measured, and plural sample data are acquired. For example, the plural sample data are acquired by measuring plural colors represented by second color data that correspond to plural known first color data. That is, the second color data corresponding to the first color data are acquired to serve as the sample data.

Then, targeting the respective component of the first color data corresponding to each of the acquired sample data, the sample data corresponding to the one target component are treated as point sequence data in multiple dimensions, represented by the product of the number of components of the second color data and the numbers of sample data for each component excluding the target component, and the first control points, which represent the characteristic of the approximation curve which approximates with the target components serving as parameters, are found.

Then, targeting another component, the first control points corresponding to the another target component are treated as multi-dimensional point sequence data, and the second control points representing the characteristic of the approximation curve, which approximates with the target components serving as parameters, are found. This step is carried out with the target component being sequentially altered, and final control points are found.

Then, the interpolation equation for interpolating color data other than the sample data is found from the final control points that have been found.

Since the interpolation equation found in this manner is found by least squares approximations, errors in the measurement points can be smoothed out. Consequently, the errors in the measurement points are absorbed, and accuracy of the color reproduction can be improved without measurement data being increased.

Further, the sample data is treated as multi-dimensional point sequence data and the control points representing the characteristics of the approximating approximation curves are found sequentially. Therefore, the control points reflect all the sample data, and accurate color reproduction is possible with a small number of samples.

Moreover, because the interpolation equation is found using least squares approximations, divergence as in a neural network will not occur, and the interpolation equation can be found reliably.

Hence, because of the interpolation equation being found in this manner, the second color data can be reproduced from the first color data with good accuracy in a short processing duration, using the interpolation equation that has been found.

Herein, the first control points to the final control points may be found by least squares approximations with B-spline curves.

A second aspect of the present invention is a color reproduction method that finds second color data (x,y,z), constituted by three components x, y and z which are represented in a second color system, corresponding to first color data (u,v, w), constituted by three components u, v and w which are represented in a first color system, the second color system differing from the first color system, and the color reproduction method including: measuring each color represented by the second color data that corresponds to a predetermined plurality of the first color data, and acquiring (A, B, C) units of sample data for the respective components of the first color data; targeting the u components of the first color data corresponding to each of the acquired sample data, treating the sample data corresponding to the target components as A units of point sequence data in 3 components×B×C dimensions, performing a least squares approximation with a B-spline curve with the target u components serving as parameters, and finding Mu units of first control points which represent a characteristic of the B-spline curve in 3×B×C dimensions; targeting the v components of the first color data corresponding to each of the acquired sample data, treating the first control points corresponding to the target components as B units of point sequence data in 3 components×C× Mu dimensions, performing a least squares approximation with a B-spline curve with the target v components serving as parameters, and finding Mv units of second control points which represent a characteristic of the B-spline curve in 3×C× Mu dimensions; targeting the w components of the first color data corresponding to each of the acquired sample data, treating the second control points corresponding to the target components as C units of point sequence data in 3 components×Mu×Mv dimensions, performing a least squares approximation with a B-spline curve with the target w components serving as parameters, and finding Mw units of third control points which represent a characteristic of the B-spline curve in 3×Mu×Mv dimensions; and finding an interpolation equation from the third control points that have been found, for interpolating the color data other than the sample data.

According to the second aspect, the respective colors represented by the second color data corresponding to the predetermined first color data are measured and (A, B, C) units of sample data for the respective components (u, v, w) of the first color data are acquired.

Then, targeting the u components of the first color data corresponding to the respective acquired sample data, the sample data corresponding to the target component are treated as the A units of point sequence data in the 3 components (the number of components of the second color data)× B×C dimensions, and the least squares approximation with the B-spline curve is performed, with the target u components serving as parameters. Thereby, the Mu units of first control points representing the characteristic of the B-spline curve in 3×B×C dimensions are found.

Next, targeting the v components of the first color data corresponding to the respective acquired sample data, the first control points corresponding to the target component are treated as the B units of point sequence data in the 3 components×C×Mu dimensions, and the least squares approximation with the B-spline curve is performed, with the target v components serving as parameters. Thereby, the Mv units of second control points representing the characteristic of the B-spline curve in 3×C×Mu dimensions are found.

Then, targeting the w components of the first color data corresponding to the respective acquired sample data, the second control points corresponding to the target component are treated as the C units of point sequence data in the 3 components×Mu×Mv dimensions, and the least squares approximation with the B-spline curve is performed, with the target w components serving as parameters. Thereby, the Mw third control points representing the characteristic of the B-spline curve in 3×Mu×Mv dimensions are found.

Then, the interpolation equation for interpolating color data other than the sample data is found from the third control points that have been found.

Since the interpolation equation found in this manner is found by least squares approximations, errors in the measurement points can be smoothed out. Consequently, the errors in the measurement points are absorbed, and accuracy of the color reproduction can be improved without measurement data being increased.

Further, the sample data is treated as multi-dimensional point sequence data and the control points representing the characteristics of the B-spline curves are found sequentially. Therefore, the control points reflect all of the sample data, and accurate color reproduction is possible with a small number of samples.

Moreover, because the interpolation equation is found using least squares approximations, divergence as in a neural network will not occur, and the interpolation equation can be found reliably.

Hence, because of the interpolation equation being found in this manner, the second color data can be reproduced from the first color data with good accuracy in a short duration, using the interpolation equation that has been found.

The interpolation equation found as described above can be, for example, the interpolation equation shown below:

$$\begin{pmatrix} x \\ y \\ z \end{pmatrix} = \sum_i^{M_u} \sum_j^{M_v} \sum_k^{M_w} \begin{pmatrix} P_{ijk}^x \\ P_{ijk}^y \\ P_{ijk}^z \end{pmatrix} N_i^u(u) N_j^v(v) N_k^w(w)$$

in which x is the value of the x component of the second color data;
y is the value of the y component of the second color data;
z is the value of the z component of the second color data;
u is the value of the u component of the first color data;
v is the value of the v component of the first color data;
w is the value of the w component of the first color data;
$P^x$, $P^y$, and $P^z$ are control points;
$N^u$, $N^v$, and $N^w$ are basis functions;
$M_u$, $M_v$, and $M_w$ are numbers of control points (=numbers of basis functions); and characters indicated in bold fonts are vectors.

Herein, in the following descriptions, vector symbols are in places indicated with "vector" before the symbol instead of being shown by bold characters.

Effect of the Invention

According to the present invention as described hereabove, color reproduction with good accuracy in a short duration is possible.

BRIEF DESCRIPTION OF THE DRAWINGS

FIG. 4 is a table showing A×B×C points in three dimensions.

FIG. 5 is a table showing A points in 3×B×C dimensions.

FIG. 7 is a table showing Mu control points in 3×B×C dimensions.

FIG. 8 is a table showing Mu×B×C control points in 3 dimensions.

FIG. 9 is a table showing B×C×Mu units of control point data in 3 dimensions, which have been sorted.

FIG. 12 is a table showing Mu×Mv×Mw units of control point data in three dimensions, which have been sorted.

FIG. 14 is a table showing a portion of 9×9×9 sampled data.

BEST MODE FOR CARRYING OUT THE INVENTION

Below, one example of an exemplary embodiment of the present invention will be described in detail with reference to the drawings.

Figure 1:
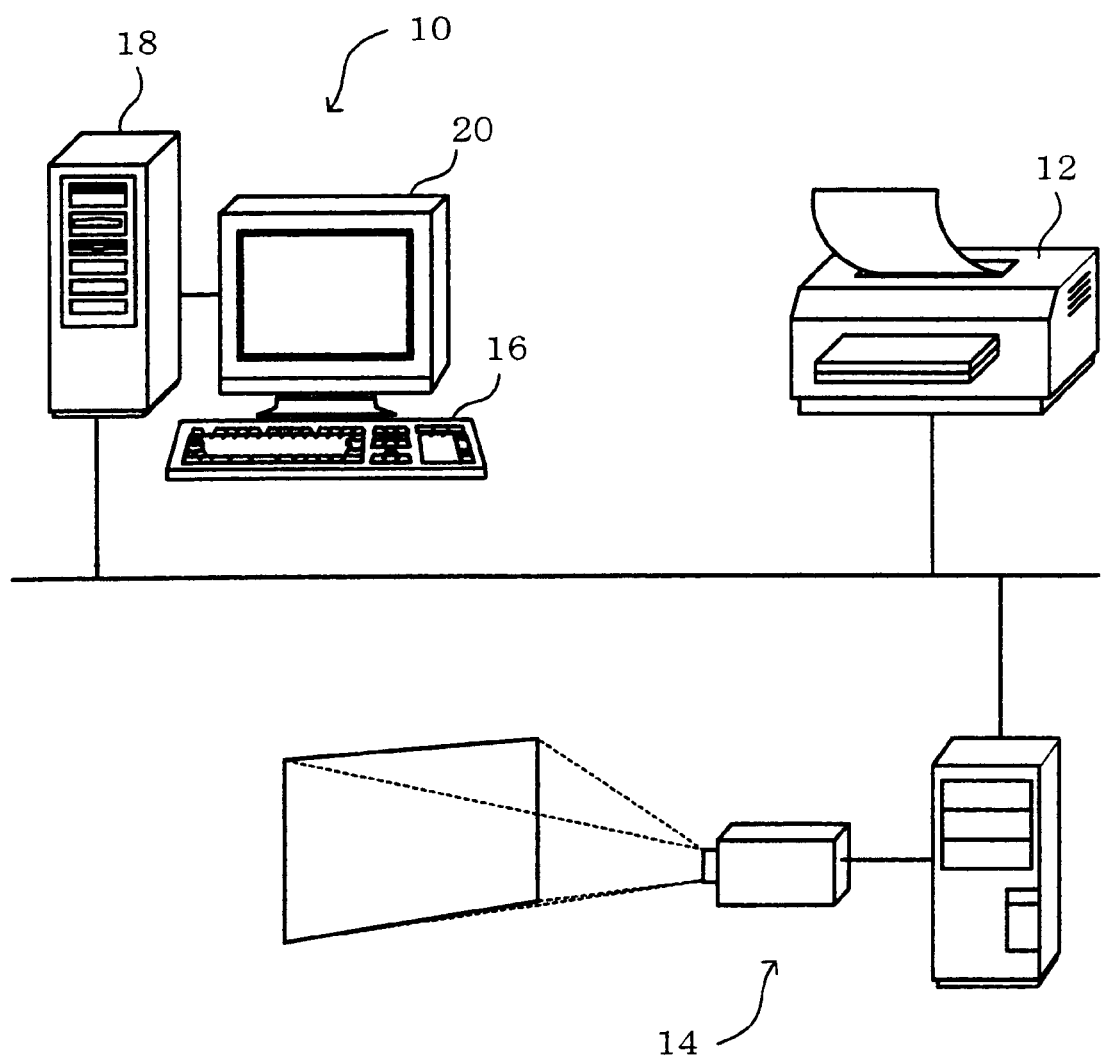
FIG. 1 is a diagram showing schematic structure of a color reproduction apparatus relating to an embodiment of the present invention.

FIG. 1 is a diagram showing schematic structure of a color reproduction apparatus relating to the embodiment of the present invention.

As shown in FIG. 1, the color reproduction apparatus is provided with a personal computer 10, and devices such as a printer 12, a projector 14 and the like.

The personal computer 10 is structured by a keyboard 16 for inputting data and the like, a computer main body 18 which calculates and outputs data for outputting required colors through a device such as the printer 12, the projector 14 or the like in accordance with a program stored in advance, and a monitor 20 which displays calculation results of the computer main body 18. Herein, as the printer 12, there may be, for example, a color hard copy apparatus based on a thermal transfer system, an inkjet system, an electrophotography system or a silver salt photography system which outputs a color copy image, with color data in an RGB color system as input values.

The present invention formularizes a relationship between inputs and outputs (output=f(input)) by approximating results that output m elements ($Out_1$, $Out_2$, $Out_3$, ..., $Out_m$) when n elements (input ($In_1$, $In_2$, $In_3$, ... $In_n$)) are inputted, and performs non-linear interpolation. Herein, in the present embodiment, a least squares method is used for approximation of output results. However, the present invention is not limited thus; an elastic energy minimization method ("Modeling of Curves and Surfaces in CAD/CAM", Hosaka Mamoru, Tokyo Denki University Publishing Office, pp. 142-144 (1996)) or the like could be used.

Figure 2A:
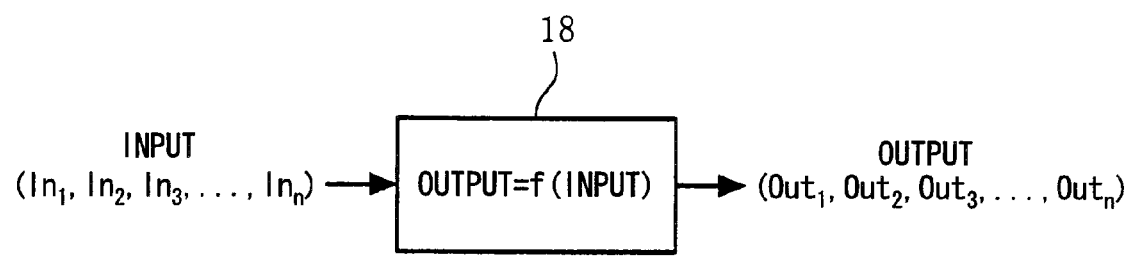
FIG. 2A is a diagram for describing a schematic of processing performed by the color reproduction apparatus relating to the embodiment of the present invention.
Figure 2B:
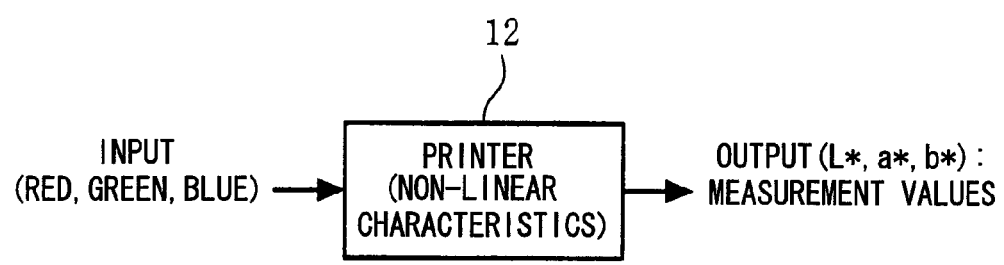
FIG. 2B is a diagram for describing a schematic of processing performed by the color reproduction apparatus relating to the embodiment of the present invention.

In the present embodiment, as shown in FIG. 2B, output of three elements (L*, a*, b*) corresponding to input of three elements (Red, Green, Blue) is given as an example for the formularization performed by a non-linear least squares approximation in multiple dimensions using a B-spline curve, and the non-linear interpolation.

Now, a method of formularization by multi-dimensional non-linear least squares approximations using B-spline curves will be described.

In the present embodiment, acquired values of the input three elements (Red, Green, Blue) are each possible from 0 to 255, and a total number of colors is extremely large at 16,777,216 (equals 256×256×256). Therefore, measurement is performed by taking A samples of red $\{u_1, u_2, u_3, \ldots, uA\}$, B samples of green $\{v_1, v_2, v_3, \ldots, v_B\}$ and C samples of blue $\{w_1, w_2, w_3, \ldots, w_C\}$. An interpolation formula for accurately interpolating all data is found from the acquired A×B×C units of three-dimensional (L*,a*,B*) data $\{(x_{1,1,1}, y_{1,1,1}, z_{1,1,1}), (x_{1,1,2}, y_{1,1,2}, z_{1,1,2}), \ldots, (x_{A,B,C}, y_{A,B,C}, z_{A,B,C})\}$.

Figure 3:
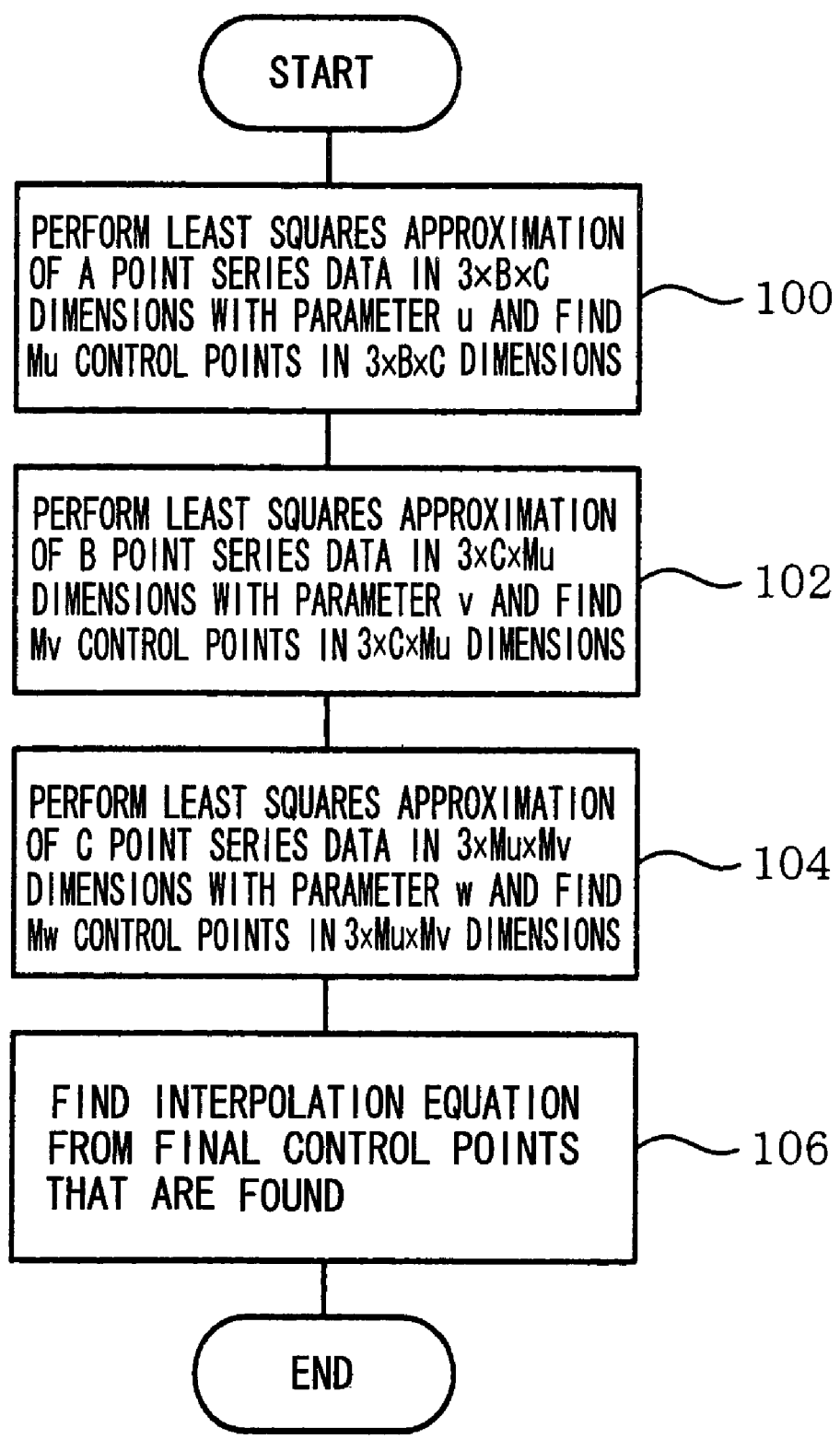
FIG. 3 is a flowchart showing a flow of finding an interpolation equation.

FIG. 3 is a flowchart showing a flow of finding an interpolation equation. In the following specific descriptions of respective steps, a case in which measurement samples of respective colors at an RGB 8-bit device (gradations of 0 to 255) are set to nine levels (0, 32, 64, 96, 128, 160, 192, 224 and 255) is described as an example. Further, for the present embodiment, a case of sampling in which the sample values are equally spaced values and are respectively the same values for red, green and blue is given as an example. However, this is not limiting; they need not be equally spaced, and they need not be the same values for each of red, green and blue.

First of all, in step 100, A units of 3×B×C-dimensional point sequence data are least squares approximated with the parameters u, and Mu units of control points in 3×B×C-dimensions are found.

That is, when red component is targeted, in the measured data, a number of green samples is B and a number of blue samples is C, and each has three components L*, a* and b*. Therefore, as shown in FIG. 4, there are B×C points in three dimensions corresponding to each of $u_1$ to $u_A$ of red. In other word, as shown in FIG. 5, outputs (sample data) corresponding to each of $u_1$ to $u_A$ can be considered as being points in 3-components×B×C dimensions.

Further, because the number of red samples is A, an interpretation that there are A points in 3×B×C dimensions is possible.

Figure 6A:
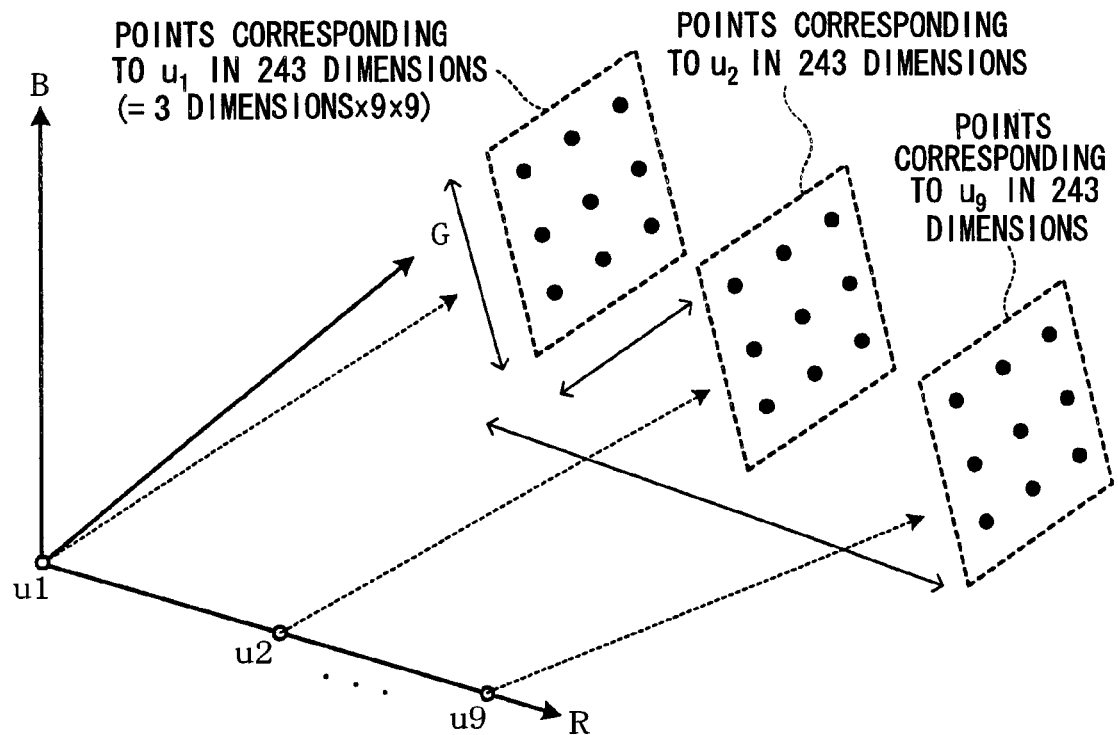
FIG. 6A is a diagram showing point sequence data in 243 dimensions corresponding to parameters u.
Figure 6B:
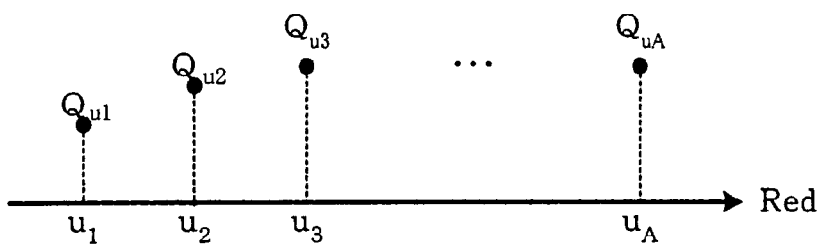
FIG. 6B is a diagram showing point sequence data in 3×B×C dimensions corresponding to red.

In the example described above, 81 (=the number of green samples 9×the number of blue samples 9) point data in three dimensions corresponding to each of $u_1$ to $u_9$ of red, shown in FIG. 6A, can be treated as respective points {vector $Q_{u1}$, vector $Q_{u2}$, . . . , vector $Q_{uA}$} in 243 dimensions, as shown in FIG. 6B.

Figure 6C:
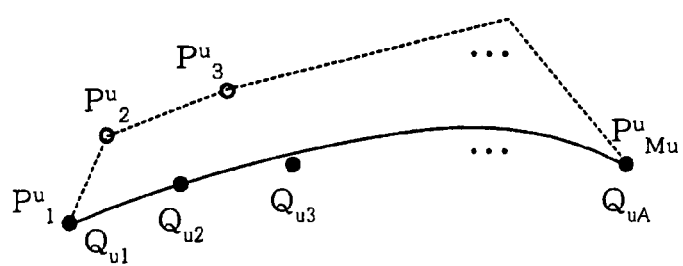
FIG. 6C is a diagram showing point sequence data in 3×B×C dimensions, found by performing a least squares approximation with a B-spline curve.

Accordingly, as shown in FIG. 6C, A units of point sequence data in 3×B×C dimensions {vector $Q_{u1}$, vector $Q_{u2}$, . . . , vector $Q_{uA}$} are least squares approximated with a B-spline curve, and Mu units of control points {vector $P^u_1$, vector $P^u_2$, . . . , vector $P^u_{Mu}$}, which represent characteristics of the B-spline curve in 3×B×C dimensions, are found.

Here, a vector C(u) of a B-spline curve can generally be represented by equation (1) shown below (for example, reference document 1 ("A Practical Guide to NURBS for CAD-CG Engineers", Miura Akira and Mochizuki Kazumasa, Kogyo Chosa Kai (2001)), reference document 2 ("A Quick Guide to NURBS for CAD-CG Engineers", Miura Akira, Nakajima Takayuki and Ono Takanori, Kogyo Chosa Kai (2002)) and the like).

$$C(u) = P^u_1 N^u_1(u) + P^u_2 N^u_2(u) + \ldots + P^u_{Mu} N^u_{Mu}(u) \quad (1)$$

$$= \sum_{i=1}^{Mu} P^u_i N^u_i(u)$$

in which

P: control points

N: B-spline basis functions

The least squares approximation with this B-spline curve is performed and the control points {vector $P^u_1$, vector $P^u_2$, . . . , vector $P^u_{Mu}$} are found. At this time, it is necessary to indicate the B-spline basis functions {vector $N^u_1(u)$, vector $N^u_2(u)$, . . . , vector $N^u_{Mu}(u)$}. Herein, the number of control points Mu and the B-spline basis functions {vector $N^u_1(u)$, vector $N^u_2(u)$, . . . , vector $N^u_{Mu}(u)$} are uniquely determined by specifying an order of the B-spline curve, an index of continuity, a number of segments, and a knot vector T {$t_1$, $t_2$, . . . , $t_{Mu+M}$}, and thus are suitably set.

Number of control points Mu=order+(number of levels–2)×multiplicity

Number of levels M=order+1

Multiplicity=order-index of continuity

Basis function $$N^u_i(u) = N_{j,M}(t) = \frac{t - t_j}{t_{j+M-1} - t_j} N_{j,M-1}(t) + \frac{t_{j+M} - t}{t_{j+m} - t_{J+1}} N_{J+1,M-1}(t) \quad (2)$$

Here, in equation (1), the vectors C, vectors P and vectors N are each in 3×B×C dimensions. Therefore, they can be rewritten as in the following equation.

$$\begin{bmatrix} C_1(u) \\ C_2(u) \\ C_3(u) \\ \vdots \\ C_{3 \times B \times C}(u) \end{bmatrix} = \quad (3)$$

$$\begin{bmatrix} P^u_{1,1} & P^u_{1,2} & P^u_{1,3} & \ldots & P^u_{1,Mu} \\ P^u_{2,1} & P^u_{2,2} & P^u_{2,3} & \ldots & P^u_{2,Mu} \\ P^u_{3,1} & P^u_{3,2} & P^u_{3,3} & \ldots & P^u_{3,Mu} \\ \vdots & \vdots & \vdots & \ldots & \vdots \\ P^u_{3 \times B \times C,1} & P^u_{3 \times B \times C,2} & P^u_{3 \times B \times C,3} & \ldots & P^u_{3 \times B \times C,Mu} \end{bmatrix} \begin{bmatrix} N^u_1(u) \\ N^u_2(u) \\ N^u_3(u) \\ \vdots \\ N^u_{Mu}(u) \end{bmatrix}$$

Now, the least squares method is a process which finds coefficients such that a sum S of squares of differences is at a minimum. Here, the B-spline curve should be found so as to pass through the measured sample points or pass close to the measured sample points. Hence, with equation (3), control points {vector $P^u_1$, vector $P^u_2$, . . . , vector $P^u_{Mu}$} with which the sum of squares of differences from the sampled measurement data is at a minimum are found by the least squares method. Herein, the sum S of squares of differences from the sampled measurement data is shown in the following equation (4).

$$S = \left( \sum_{i=1}^{Mu} P^u_i N^u_i(u_1) - C(u_1) \right)^2 + \left( \sum_{i=1}^{Mu} P^u_i N^u_i(u_2) - C(u_2) \right)^2 + \ldots + \quad (4)$$

$$\left( \sum_{i=1}^{Mu} P^u_i N^u_i(u_A) - C(u_A) \right)^2$$

$$= \sum_{j=1}^{A} \left( \sum_{i=1}^{Mu} P^u_i N^u_i(u_j) - C(u_j) \right)^2$$

By solving this equation (4), the Mu control points in the 3×B×C dimensions {vector $P^u_1$, vector $P^u_2$, . . . , vector $P^u_{Mu}$} can be obtained. The Mu control points in the 3×B×C dimensions found by solving equation (4) are shown in FIG. 7. Herein, the control points found here correspond to first control points of the present invention.

In other word, the Mu sets of B×C units of three-dimensional control points are obtained by non-linear least squares approximation in multiple dimensions. The Mu×B×C control points in three dimensions are shown in FIG. 8.

In the case of the example described above, if the B-spline curve employed for the least squares approximation is set to 3 orders, C1 continuity and 2 segments, Mu=6 control points can be obtained. Nine points in 243 dimensions (=3 components×the number of green samples 9×the number of blue samples 9) are least squares approximated with the vector C(u) of the B-spline curve shown below, and the vectors $P^u$ of the control points can be found.

$$C(u) = P^u_1 N^u_1(u) + P^u_2 N^u_2(u) + \ldots + P^u_{Mu} N^u_{Mu}(u)$$

Next, in step 102, B units of point sequence data in 3×C×Mu dimensions are least squares approximated with the parameters v, and Mv control points in 3×C×Mu dimensions are found.

That is, when targeting green component, when the Mu×B×C units of control point data in three dimensions found in step 100 are sorted into ascending order for green, blue and red, they are as shown in FIG. 9. Now, similarly to step 100, in the control point data, a number of blue samples is C and a number of red samples is Mu, and each has three components L*, a* and b*. Therefore, outputs corresponding to $v_1$ for green (the first control points of the present invention) are C×Mu points in three dimensions. That is, $v_1$ can be considered as being a point in 3×C×Mu dimensions. Further, because the number of green samples is B, an interpretation that there are B points in 3×C×Mu dimensions is possible.

Figure 10A:
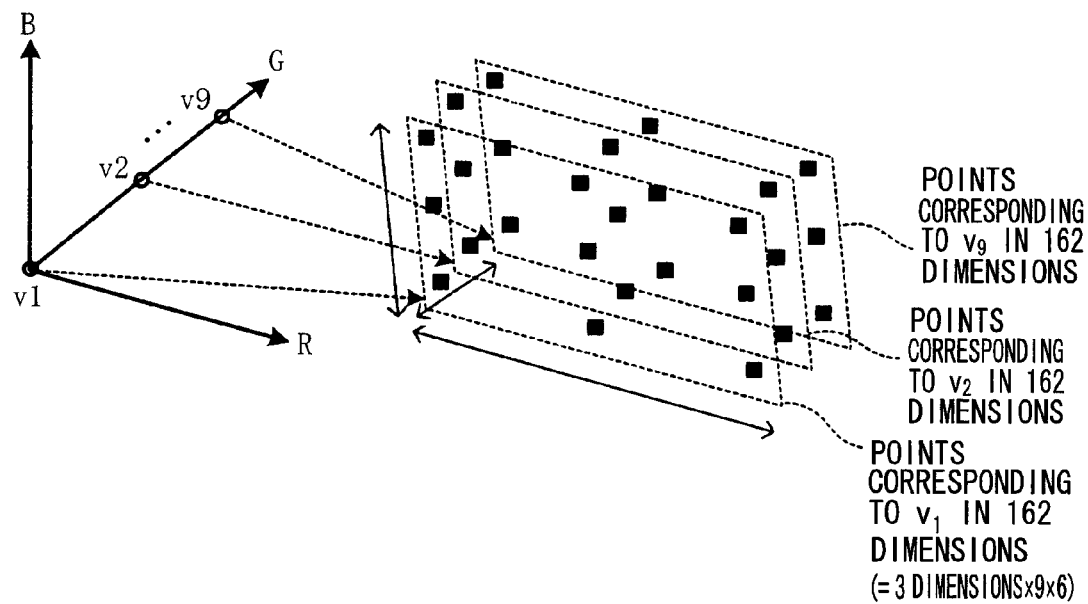
FIG. 10A is a diagram showing point sequence data in 162 dimensions corresponding to parameters v.
Figure 10B:
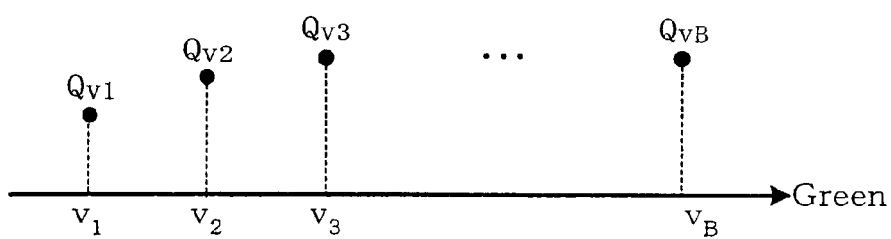
FIG. 10B is a diagram showing point sequence data in 3×C×Mu dimensions corresponding to green.

In the example described above, 54 (=the number of blue samples 9×the number of control points Mu 6) point data in three dimensions corresponding to each of $v_1$ to $v_9$ of green, shown in FIG. 10A, can be treated as respective points {vector $Q_{v1}$, vector $Q_{v2}$, ..., vector $Q_{vB}$} in 162 dimensions, as shown in FIG. 10B.

Now, similarly to step 100, these B units of point sequence data in 3×C×Mu dimensions {vector $Q_{v1}$, vector $Q_{v2}$, ..., vector $Q_{vB}$} are least squares approximated with a B-spline curve, and Mv control points {vector $P^{uv}_1$, vector $P^{uv}_2$, ..., vector $P^{uv}_{Mv}$}, which represent characteristics of the B-spline curve in 3×C×Mu dimensions, are found. Herein, the control points found here correspond to second control points of the present invention.

As a result, the Mv control points in 3×C×Mu dimensions can be obtained. Put another way, the Mv set of C×Mu units of three-dimensional control points are obtained by non-linear least squares approximation in multiple dimensions.

In the case of the example described above, similarly to step 100, if the B-spline curve employed for the least squares approximation is set to 3 orders, C1 continuity and 2 segments, there are Mv=6 control points. Nine points in 162 dimensions (=3 components×the number of blue samples C×Mu=3×9×6) are least squares approximated with a vector C(v) of the B-spline curve shown below, and the vectors $P^{uv}$ of the control points can be found.

$$C(v) = P^{uv}_1 N^v_1(v) + P^{uv}_2 N^v_2(v) + \ldots + P^{uv}_{Mv} N^v_{Mv}(v)$$

Then, in step 104, C units of point sequence data in 3×Mu×Mv dimensions are least square approximated with the parameters w, and Mw control points in 3×Mu×Mv dimensions are found.

That is, when targeting blue component, the Mv×C×Mu units of control point data in three dimensions found in step 102 are sorted into ascending order for blue, red and green. Similarly to step 100, in the control point data, a number of red samples is Mu and a number of green samples is Mv, and each has three components L*, a* and b*. Therefore, outputs corresponding to $w_1$ for blue (the second control points of the present invention) are Mu×Mv points in three dimensions. In the other word, $w_1$ can be considered as being a point in 3×Mu×Mv dimensions.

Figure 11A:
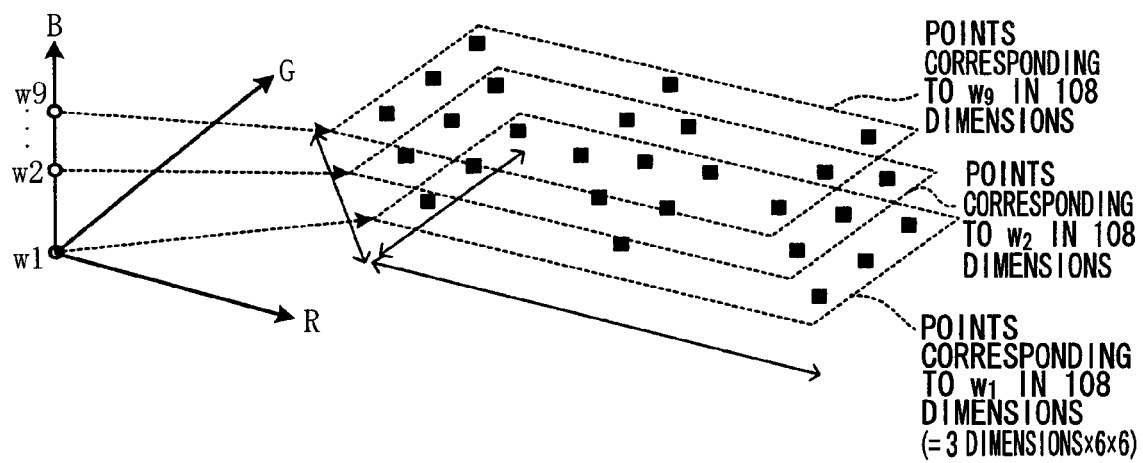
FIG. 11A is a diagram showing point sequence data in 108 dimensions corresponding to parameters w.
Figure 11B:
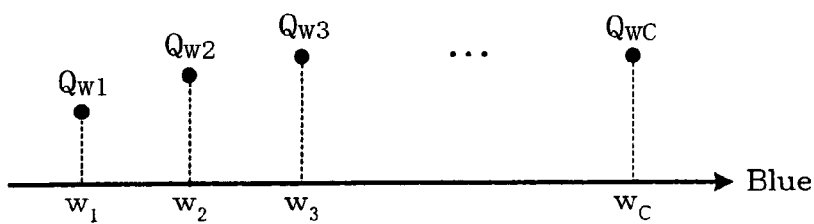
FIG. 11B is a diagram showing point sequence data in 3×Mu×Mv dimensions corresponding to blue.

Further, because the number of blue samples is C, an interpretation that there are C points in 3×Mu×Mv dimensions is possible. In the example described above, 36 (=the number of control points Mu 6×the number of control points Mv 6) point data in three dimensions corresponding to each of $w_1$ to $w_9$ of blue, shown in FIG. 11A, can be treated as respective points {vector $Q_{w1}$, vector $Q_{w2}$, ..., vector $Q_{wC}$} in 108 dimensions, as shown in FIG. 11B.

Now, similarly to step 100, these C units of point sequence data in 3×Mu×Mv dimensions {vector $Q_{w1}$, vector $Q_{w2}$, ..., vector $Q_{wC}$} is least squares approximated with a B-spline curve, and Mw control points {vector $P^{uvw}_1$, vector $P^{uvw}_2$, ..., vector $P^{uvw}_{Mw}$}, which represent characteristics of the B-spline curve in 3×Mu×Mv dimensions, are found. Herein, the control points found here correspond to third control points of the present invention.

As a result, the Mw control points in 3×Mu×Mv dimensions can be obtained. That is, the Mw sets of Mu×Mv units of three-dimensional control points are obtained by non-linear least squares approximation in multiple dimensions.

In the case of the example described above, similarly to step 100, if the B-spline curve employed for the least squares approximation is set to 3 orders, C1 continuity and 2 segments, there are Mw=6 control points. Nine points in 108 dimensions (3 components×Mu×Mv=3×6×6) are least squares approximated with a vector C(w) of the B-spline curve shown below, and the vectors $P^{uvw}$ of the control points can be found.

$$C(w) = P^{uvw}_1 N^w_1(w) + P^{uvw}_2 N^w_2(w) + \ldots + P^{uvw}_{Mw} N^w_{Mw}(w)$$

Then, in step 106, an interpolation equation is found from the final control points that have been found.

That is, when the control point data that have been found are sorted into ascending order in red, green and blue, they are as shown in FIG. 12. These Mu×Mv×Mw control points in three dimensions (the data total is 3×Mu×Mv×Mw) are divided into L*, a* and b* components, and form a vector $P^x \{P^{uvw}_{1,1}, \ldots, P^{uvw}_{3 \times Mu \times Mv, Mw-2}\}$, a vector $P^y \{P^{uvw}_{1,2}, \ldots, P^{uvw}_{3 \times Mu \times Mv, Mw-1}\}$ and a vector $P^z \{P^{uvw}_{1,3}, \ldots, P^{uvw}_{3 \times Mu \times Mv, Mw}\}$. When an interpolation equation is found from these control point data and the B-spline basis functions employed in step 100 to step 104 {vector $N^u_1(u)$, vector $N^u_2(u)$, ..., vector $N^u_{Mu}(u)$}, {vector $N^v_1(v)$, vector $N^v_2(v)$, ..., vector $N^v_{Mv}(v)$} and {vector $N^w_1(w)$, vector $N^w_2(w)$, ..., vector $N^w_{Mw}(w)$}, equation (5) shown below can be obtained.

$$\begin{pmatrix} x \\ y \\ z \end{pmatrix} = f(u, v, w) \quad (5)$$

$$= \begin{pmatrix} f_x(u, v, w) \\ f_y(u, v, w) \\ f_z(u, v, w) \end{pmatrix}$$

$$= \sum_i^{Mu} \sum_j^{Mv} \sum_k^{Mw} \begin{pmatrix} P^x_{ijk} \\ P^y_{ijk} \\ P^z_{ijk} \end{pmatrix} N^u_i(u) N^v_j(v) N^w_k(w)$$

Hence, an interpolation equation for interpolating outputs L*a*b* (CIELAB) with respect to inputs RGB is as equation (6) shown below.

$$\begin{pmatrix} L^* \\ a^* \\ b^* \end{pmatrix} = \sum_i^{M_B} \sum_j^{M_G} \sum_k^{M_B} \begin{pmatrix} P^{L^*}_{ijk} \\ P^{a^*}_{ijk} \\ P^{b^*}_{ijk} \end{pmatrix} N^R_i(R) N^G_j(G) N^B_k(B) \quad (6)$$

in which
L*: CIELAB L* value
a*: CIELAB a* value
b*: CIELAB b* value
R: red gradation value (0 to 255)
G: green gradation value (0 to 255)
B: blue gradation value (0 to 255)
$P^{L*}, P^{a*}, P^{b*}$: control points
$N^R, N^G, N^B$: basis functions
$M_R, M_G, M_B$: numbers of control points (=numbers of basis functions)

The equation (6) that has been found in this manner is a linear coupling of the control points (vectors P) and basis functions (vectors N) of the B-spline curves. However, since this equation is a multiplication equation in which the control points (vectors P) are coefficients and which has the B-spline basis functions (vectors N) as inputs in variables, equation (6) is a non-linear interpolation. Therefore, all colors of the device can be obtained by using the interpolation equation (equation (6)).

Further, because the above-described interpolation equation is found by least squares approximations, errors in measurement points can be smoothed out. Consequently, the errors in the measurement points can be absorbed, and accuracy of the color reproduction can be improved without measurement data being increased.

Further, in the present embodiment, the sample data is treated as multi-dimensional point sequence data and the control points representing the characteristics of the approximating approximation curves (the B-spline curves) are found sequentially. Therefore, the control points may reflect all the sample data, and accurate color reproduction is possible with a small number of samples.

Hence, because the interpolation equation has been found in this manner, the second color data can be reproduced from the first color data with good accuracy in a short processing duration, using the interpolation equation that has been found.

Herein, in the present embodiment, least squares approximations are performed in the sequence of parameters u→v→w. However, the same effects can be provided even if least squares approximations are performed in another order.

Next, processing which is performed by the computer main body 18 using the interpolation equation that has been obtained as described above, and which estimates values of required colors from values of already known colors, will be described.

Figure 13:
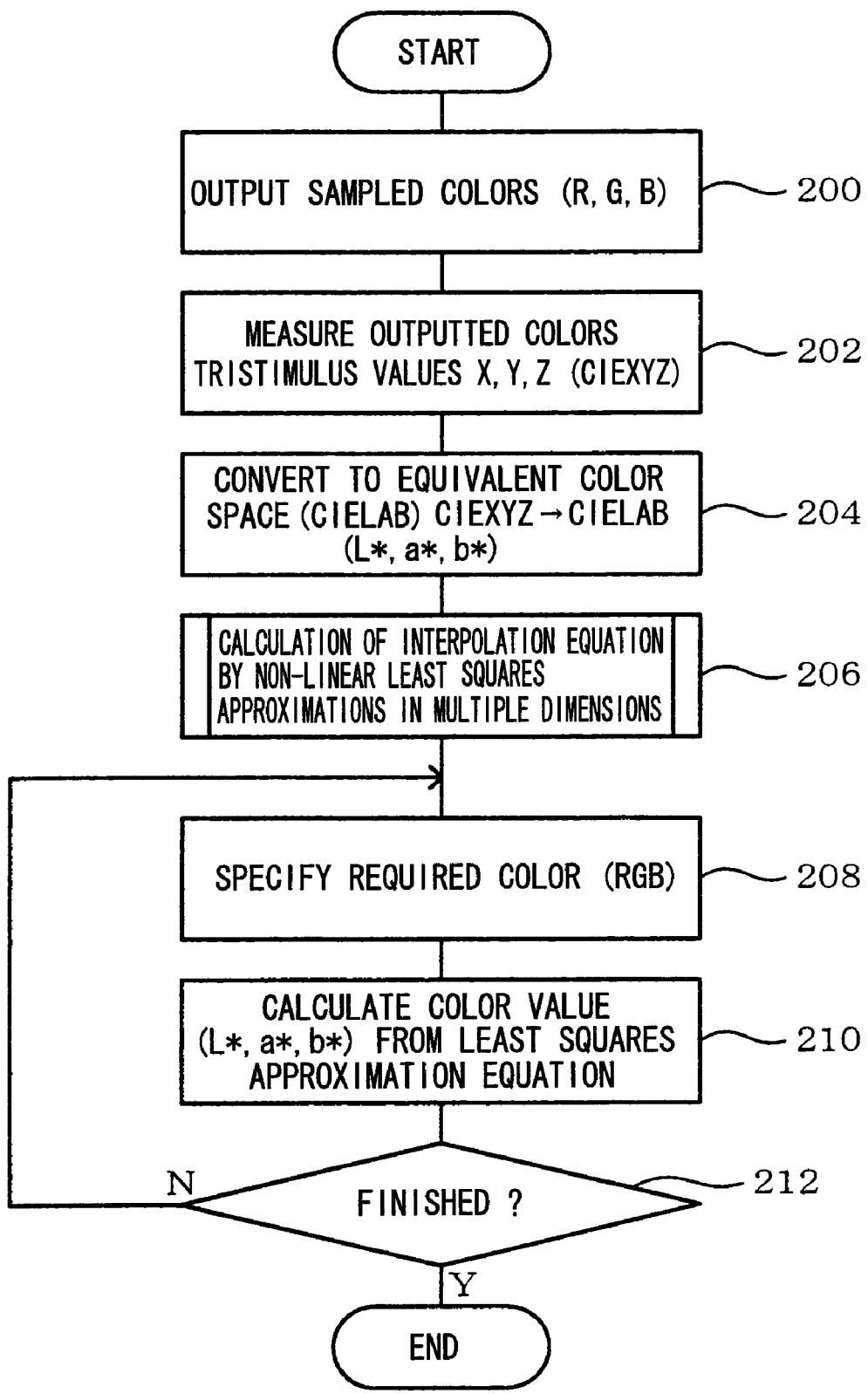
FIG. 13 is a flowchart showing an example of a flow of processing for estimating values of required colors from values of previously known colors.

FIG. 13 is a flowchart showing an example of a flow of processing for estimating values of required colors from values of known colors.

In step 200, output of sampled colors is performed and the processing proceeds to step 202. That is, output is performed with respect to sampled input values.

In step 202, measurement of outputted colors is performed and the processing proceeds to step 204. In the present embodiment, measurement values of tristimulus values X, Y, Z (CIEXYZ) are obtained.

In step 204, a conversion of the sampled measurement values measured in step 202 to an equivalent color space (CIELAB) is performed and L*, a*, b* values are obtained (CIEXYZ→CIELAB). Herein, in step 204, the conversion is to CIELAB (the CIE 1976 L*a*b* color space), which is an equivalent color space for estimating color characteristics. However, this is not limiting, and some other color space may be employed.

Next, in step 206, multi-dimensional non-linear least squares approximations are performed and the processing proceeds to step 208. That is, an interpolation equation is found through the above-described flowchart of FIG. 3.

In step 208, a required color (Red,Green,Blue) is specified and the processing proceeds to step 210.

In step 210, a color value (L*,a*,b*) is calculated using the interpolation equation found in step 206 (a least squares approximation equation), and the processing proceeds to step 212.

In step 212, it is determined whether or not estimation of the color values has finished. If this determination is negative, the processing returns to step 208 and the above-described processing is repeated. When the determination of step 212 is positive, the example processing finishes.

Now, the inputs of red, green and blue are respectively sampled in 9 levels (0, 32, 64, 96, 128, 160, 192, 224 and 255).

In the following, all of data 256×256×256 is interpolated from 9×9×9 data with a conventional process and the process of the present embodiment, and interpolation results and color differences from actual values are found, and results of comparatively evaluating the conventional process and the process according to the present embodiment will be described.

Figures 15A, 15B:
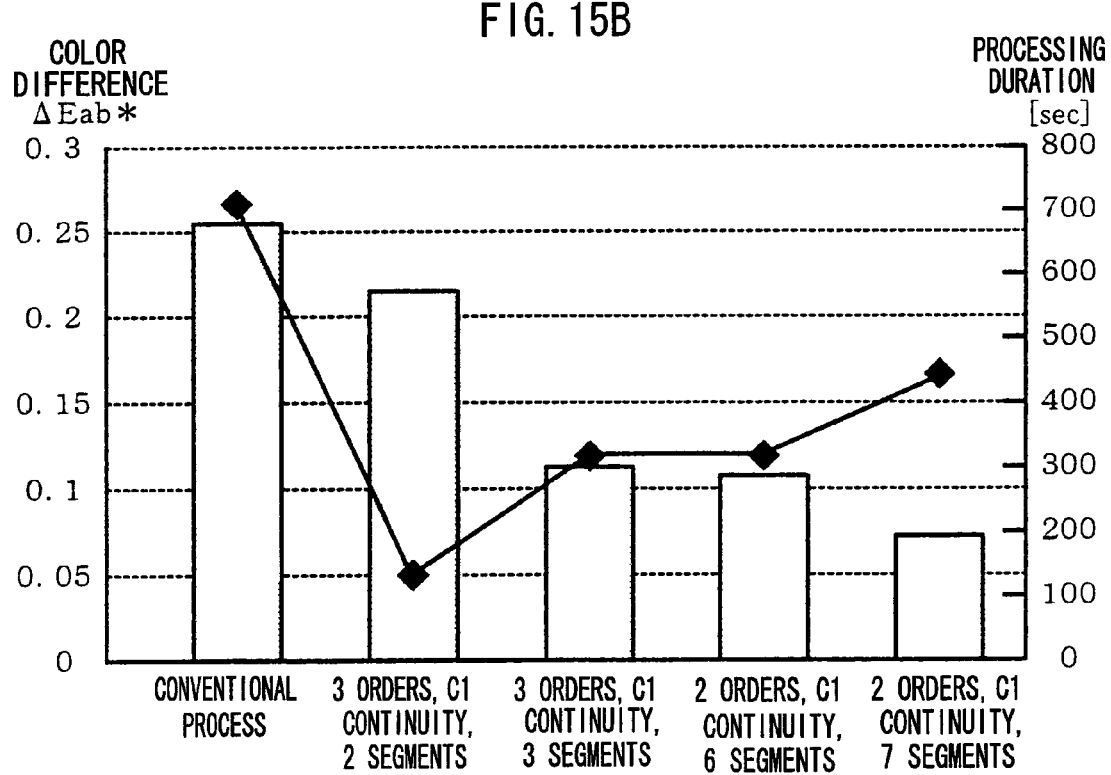
FIG. 15A is a table showing results of comparison of a conventional process with a process according to the present embodiment.
FIG. 15B is a graph showing results of comparison of the conventional process with the process according to the present embodiment.
Figure 16A:
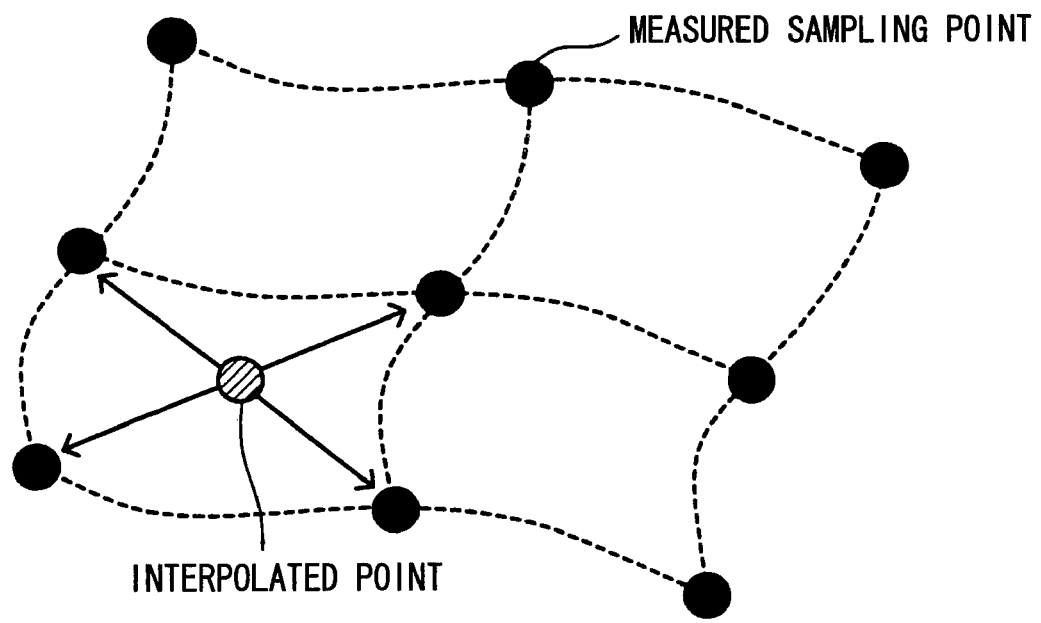
FIG. 16A is a diagram showing linear interpolation.
Figure 16B:
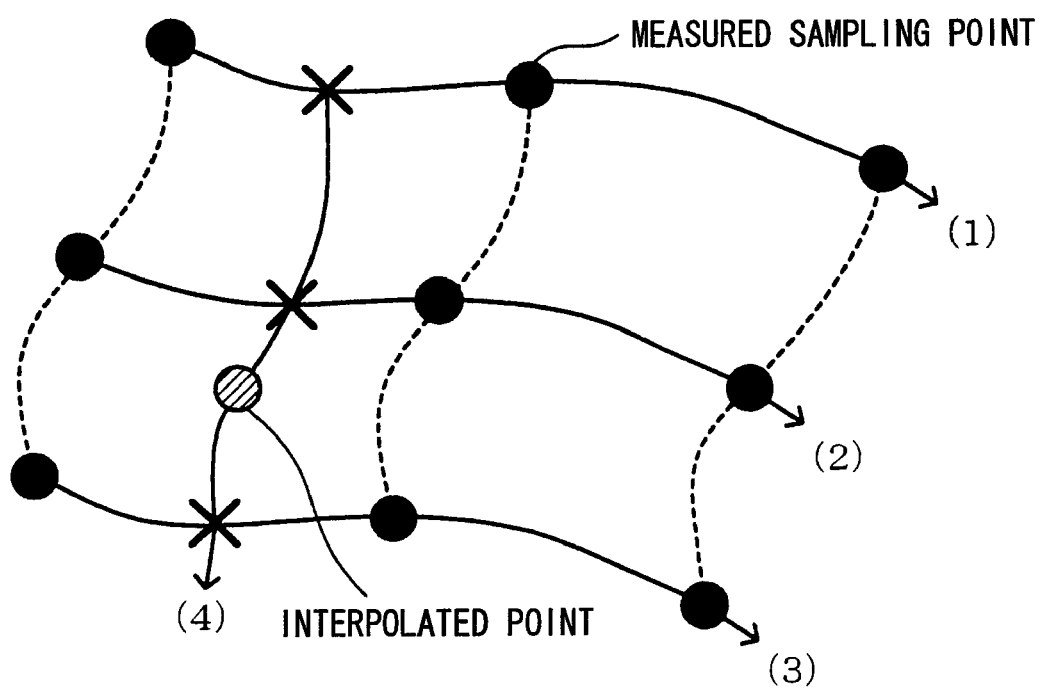
FIG. 16B is a diagram showing curvilinear interpolation.

FIG. 14 is a table showing a portion of 9×9×9 sampled data. FIG. 15A is a table showing results of comparison of the conventional process with the process according to the present embodiment. FIG. 15B is a graph showing results of the comparison of the conventional process with the process according to the present embodiment.

Here, since actual values are needed to be already known for the evaluation, data obtained by converting RGB values to XYZ values with an sRGB theoretical formula, Specification of sRGB (specified in IEC 61966-2-1:1999), and further converting this data to Lab values are used.

For the conventional processing serving as a comparison object, the linear interpolation of Japanese Patent Application Laid-Open (JP-A) No. 7-50760 is employed. In the conventional technology that is employed, interpolation is performed using a two-dimensional B-spline curve, and a general equation thereof is equation (7) shown below.

$$L^*(D) = P_1 N_1(D) + P_2 N_2(D) + \ldots + P_M N_M(D) \quad (7)$$

$$= \sum_{i=1}^{M} P_i N_i(D)$$

in which
L*: CIELAB L* value
D: gradation value (0-255)
P: control points
N: basis functions
M: number of control points (=number of basis functions)

In results of comparison of the conventional process with the process according to the present embodiment, as shown in FIG. 15A and FIG. 15B, in the process according to the present embodiment, when 3 orders, C1 continuity, 2 segments are specified, accuracy can be improved by about 1.17 times compared with the conventional process. When 3 orders, C1 continuity, 3 segments is specified, accuracy can be improved by about 2.20 times compared with the conventional process. When 2 orders, C1 continuity, 6 segments is specified, accuracy can be improved by about 2.34 times compared with the conventional process. When 2 orders, C1 continuity, 7 segments is specified, accuracy can be improved by about 3.72 times compared with the conventional process.

Further, in regard to processing duration, in the process according to the present embodiment, when 3 orders, C1 continuity, 2 segments are specified, the processing duration can be shortened by about 5.29 times compared with the conventional process. When 3 orders, C1 continuity, 3 segments is specified, the processing duration can be shortened by about 2.23 times compared with the conventional process. When 2 orders, C1 continuity, 6 segments is specified, the processing duration can be shortened by about 2.23 times compared with the conventional process. When 2 orders, C1 continuity, 7 segments is specified, the processing duration can be shortened by about 1.56 times compared with the conventional process.

Here, for the embodiment described above, the printer 12 has been employed as the device, but this is not limiting. For example, a monitor for which inputs are R, G, B and outputs are L*, a*, b*, a scanner for which inputs are L*, a*, b* and outputs are R, G, B, a printer for which inputs are Y, M, C, K, R, G, B and outputs are L*, a*, b*, or the like may be employed. Further, application to spectral reflectances or the like is possible. In such a case, for example, incidence angles of light sources, reception angles of receptors, receptor azimuth angles, rotation angles of test piece stages and the like may be employed as inputs, and spectral transmittances and the like can be employed as outputs.

The invention claimed is:

1. A color reproduction method that finds second color data, of a plurality of components represented in a second color system, corresponding to first color data of a plurality of components represented in a first color system, the second color system differing from the first color system, and the color reproduction method comprising:

measuring each of colors represented by the second color data that correspond to a predetermined plurality of the first color data, and acquiring a plurality of sample data;

targeting the respective components of the first color data corresponding to each of the acquired sample data, treating sample data corresponding to one target component as point sequence data in multiple dimensions, represented by a product of a number of components of the second color data and a number of the sample data of the respective components excluding the target component, and finding first control points which represent a characteristic of an approximation curve which approximates with the target components serving as parameters;

thereafter targeting another of the components, treating the first control points corresponding to the target component as point sequence data in the multiple dimensions, and finding second control points which represent a characteristic of an approximation curve which approximates with the target components serving as parameters;

sequentially altering the target component and finding final control points;

finding an interpolation equation from the final control points that have been found, for interpolating color data other than the sample data; and finding the respective control points, from the first control points to the final control points, by performing least squares approximations with B-spline curves, wherein least squares are approximated with vectors of the B-spline curves.

2. A color reproduction method that finds second color data (x,y,z), constituted by three components x, y and z which are represented in a second color system, corresponding to first color data (u,v,w), constituted by three components u, v and w which are represented in a first color system, the second color system differing from the first color system, and the color reproduction method comprising:

measuring each color represented by the second color data that corresponds to a predetermined plurality of the first color data, and acquiring (A, B, C) units of sample data for the respective components of the first color data;

targeting the u components of the first color data corresponding to each of the acquired sample data, treating the sample data corresponding to the target components as A units of point sequence data in 3 components×B×C dimensions, performing a least squares approximation with a B-spline curve with the target u components serving as parameters, wherein least squares are approximated with a vector of the B-spline curve, and finding Mu units of first control points which represent a characteristic of the B-spline curve in 3×B×C dimensions;

targeting the v components of the first color data corresponding to each of the acquired sample data, treating the first control points corresponding to the target components as B units of point sequence data in 3 components×C×Mu dimensions, performing a least squares approximation with a B-spline curve with the target v components serving as parameters, wherein least squares are approximated with a vector of the B-spline curve, and finding Mv units of second control points which represent a characteristic of the B-spline curve in 3×C×Mu dimensions;

targeting the w components of the first color data corresponding to each of the acquired sample data, treating the second control points corresponding to the target components as C units of point sequence data in 3 components×Mu×Mv dimensions, performing a least squares approximation with a B-spline curve with the target w components serving as parameters, wherein least squares are approximated with a vector of the B-spline curve, and finding Mw units of third control points which represent a characteristic of the B-spline curve in 3×Mu×Mv dimensions; and finding an interpolation equation from the third control points that have been found, for interpolating the color data other than the sample data.

3. The color reproduction method described in claim 2, wherein the interpolation equation found from the third control points is:

$$\begin{pmatrix} x \\ y \\ z \end{pmatrix} = \sum_i^{M_u} \sum_j^{M_v} \sum_k^{M_w} \begin{pmatrix} P^x_{ijk} \\ P^y_{ijk} \\ P^z_{ijk} \end{pmatrix} N_i^u(u) N_j^v(v) N_k^w(w)$$

in which:
x is the value of the x component of the second color data;
y is the value of the y component of the second color data;
z is the value of the z component of the second color data;
u is the value of the u component of the first color data;
v is the value of the v component of the first color data;
w is the value of the w component of the first color data;
$P^x$, $P^y$ and $P^z$ are control points;
$N^u$, $N^v$ and $N^w$ are basis functions;
$M_u$, $M_v$ and $M_w$ are numbers of control points (=numbers of basis functions); and
characters indicated in bold font are vectors.

* * * * *